J. Swartz.
Mower

No. 1315

Reissued. June. 3. 1862

Inventor. Jacob Swartz by atty
Wm. H. Harrison. Andrew Whitley

Witnesses: Wm. H. Bates.

UNITED STATES PATENT OFFICE.

JACOB SWARTZ, OF BUFFALO, NEW YORK.

IMPROVEMENT IN HARVESTERS.

Specification forming part of Letters Patent No. 11,951, dated November 14, 1865; Reissue No. 970, dated June 5, 1860; Reissue No. 1,315, dated June 3, 1862.

DIVISION C.

*To all whom it may concern:*

Be it known that I, JACOB SWARTZ, of the city of Buffalo, in the county of Erie and State of New York, have invented new and useful Improvements in Grain and Grass Harvesters, of which the following is a full, clear, and exact description of the parts thereof requisite for a proper understanding of such of said improvements as are herein claimed, reference being had to the accompanying drawings, forming part of this specification, in which—

Figure 1:
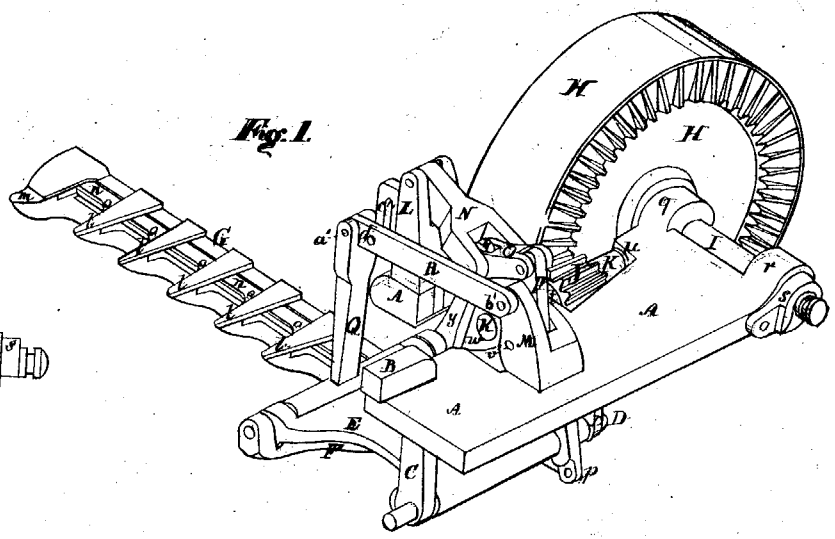
Figure 3:
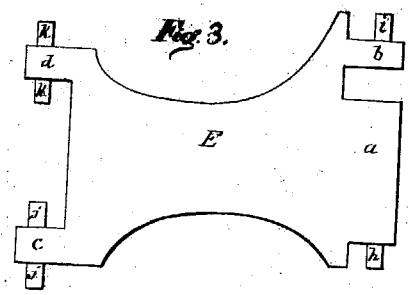
Figure 2:
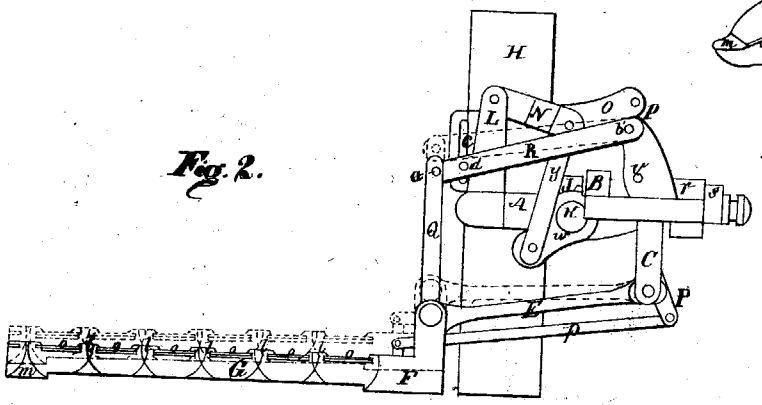
Figure 4:
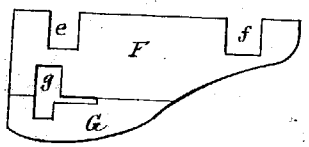

Figure 1 represents in perspective a side-cutting harvester embracing my improvements, certain parts only of which are herein claimed. Fig. 2 represents in black a front view of the entire machine, (many parts of which are shown only for illustrating the connection and variation of the parts claimed,) with the bottom of the shoe and divider on the same horizontal line or resting on the common surface of the ground and the main ground and driving wheel perpendicular, or nearly so, and a vertical plane from the ground passing through the center of the hinge-pin, which connects the shoe to the vibrating end of the coupling-arm, for showing the longitudinal variation of said shoe from the main frame when raised or lowered in respect thereto. Fig. 2 also shows in red the finger-bar raised above the ground for reaping, while the main ground and driving wheel remains in the same vertical position. Fig. 3 represents a top view of the coupling-arm and hinge-pins which connect it to the hangers and the shoe to the arm; and Fig. 4 represents a side view of the shoe, with the cavities therein for the branches of the coupling-arm, and in and between it and the finger-bar a guideway for the heel of the cutter-bar and a slot for the cutters.

The finger-bar of the cutting apparatus which I use is of the short laterally-projecting class, whose outer end has no connection with the main frame of the machine, and the inner end or heel of which does not extend across the plane in which the main ground and driving wheel moves, and the cutters of which reciprocate across said finger-bar's fingers in straight lines; and the improvement claimed under this patent consists in so connecting said cutting apparatus to the main frame of the machine that the longitudinal distance between its inner end or heel and said main frame will be varied when raised or lowered in respect thereto. The shoe, fingers, and divider have at the front edge of the finger-bar slats, through which a scalloped cutter reciprocates in a straight line. That end of the finger-bar which is connected to the shoe and terminates at or near its inner edge I call the "inner end" or "heel," and that end to which the divider is connected and which runs next to the uncut crop I call the "outer end."

Of the parts herein specified, A represents the main frame of the machine, by which the other parts are supported (except the main ground-wheel and its axle, on which the frame and other parts are supported) and drawn forward; B, the tongue, by which it is drawn forward; C and D, two hangers extending some distance below the frame, in the lower end of each of which there is a hole, in line with each other and with or nearly with the path of the machine; E, the coupling-arm, through the branches of each end of which there is a horizontal hole for the hinge-pins, which hold it and the finger-bar, which follows all the ordinary undulations of the surface of the ground, about at right angles to the path of the machine; *a*, the front branch of the end of the coupling-arm, which is connected with hangers C and D; *b*, the rear branch of the same end; *c*, the front branch of its vibrating end, and *d* the rear branch of the same end; F, the shoe at the inner end or heel of the finger-bar; *e* and *f*, cavities in said shoe for receiving the branches *c* and *d*; *g*, the guideway in and between the shoe and finger-bar for the heel of the cutter-bar and a slot for the cutters; *h*, the hinge-pin, which couples branch *a* to hanger C; *i*, that which couples branch *b* to hanger D; *j*, that which couples the front end of shoe F to branch *c*, and *k* that which couples its rear end to branch *d*; G, the finger-bar; *l l l l l*, its fingers, and *m* the divider at its outer end; *n*, the cutter-bar; *o o o o o o*, its cutters secured thereto, and *p* the pitman, through which they receive their reciprocatory motion; H, the main ground and driving wheel, which carries the main frame and gives motion to the cutters; I, its axle fast in it; *q* and *r*, the boxes in which the axle revolves; *s*, the drop-clutch, by which the main driving-cog wheel is held in and out of gear with its pinion J on its shaft K, which revolves in its boxes *t* and *u*; L and M, two posts extending above the frame. To the upper end of L there is hinged one end of a toggle-lever, N, to the other end of which is hinged one end of toggle-lever O, whose other end is hinged to the upper end of a vibrating lever, P, which is pivoted at *v* to post M, and has its lower end hinged to pitman *p* at the proper place, as shown by the drawings, for keeping the cutters and fingers in the same or nearly the same relative position to each other when raised or lowered in respect to the main frame of the machine. The proper place for that end of the pitman which receives its motion from the driving-wheel, and also the length of the pitman, will always be determined by the distance between its connection with the cutter-bar and the connection of the coupling-arm with the shoe; and when the pitman and coupling-arm can be of the same length they should have the same common center at each end. On the end of shaft K is placed a crank, *w*, in which is placed a wrist-pin, on which is placed the lower end of a connecting-rod, *y*, through the upper end of which passes the hinge-pin which connects the toggle-levers N and O together.

It will be seen that by the arrangement of parts just described the cutters will receive two motions each way during every revolution of shaft K.

Q represents the post, which extends up from shoe F to arm R; *a'*, the hinge-pin, which connects its upper end to arm R, whose other end is hinged to post M by hinge-pins *b'*; *c'*, the vertical guide-slot in post L, through which the set-screw *d'* passes into arm R, which parts limit the extent of the vibration of the inner end of the cutting apparatus toward and from the main frame of the machine to the length of slot *c'*.

It will also be seen that the cutting apparatus can be raised from the ground, and that the construction and connection of parts which enable this to be done when the tongue is rigidly connected to the main frame of the machine, as mine is, also enable the shoe of said cutting apparatus to pass into a depression of the surface while the lower periphery of the main ground and driving wheel is passing over an elevation of the surface, by the set-screw not being in the lowest part of its slot when said divider-shoe and lower periphery of the wheel are on the same horizontal plane. And it will also further be seen that by raising the cutting apparatus to the desired height, and then tightening the set-screws in its slot, said cutting apparatus can be retained at various heights above the ground.

In order to properly balance the machine and prevent side draft therein, it may be necessary to place the tongue between the wheel and shoe. To do this the main frame's width and the coupling-arm's length require to be increased so much that the animal between the tongue and standing crop will not walk on the crop.

I do not wish to be understood as claiming the invention of that class of harvesters the outer end of the finger-bar of whose cutting apparatus has no connection with the main frame of the machine and the inner end or heel of which does not extend across the plane in which the main ground and driving wheel moves, and the cutters of which reciprocate across the fingers in straight lines, as I am aware that previous to my invention such an apparatus existed, but either with the finger-bar thereof rigidly connected to the main frame of the machine, or so connected therewith that the longitudinal distance between its inner end or heel and main frame was not varied when raised or lowered in respect thereto; but I am not aware that previous to my invention a cutting apparatus, the outer end of whose finger-bar had no connection with the main frame of the machine and the inner end or head of which did not extend across the plane in which the main ground and driving wheel moves, and the cutters of which reciprocated across the fingers in straight lines, was also so connected to the main frame of the machine that the longitudinal distance between the inner end of the finger-bar and main frame would be varied when raised or lowered in respect thereto. Therefore I do not wish to be understood as limiting myself to the particular method of constructing and connecting the several parts shown and described, as it is obvious that various modifications may be made therein without departing from the principles and spirit contained in my invention; and, therefore, What I do claim under this patent is—

1. The combination, with the main frame of a harvester, of the coupling-arm E, finger-bar G, and cutter-bar *n*, substantially in the manner described.

2. The combination, with the main frame of a harvester, of the coupling-arm E, finger-bar G, cutter-bar *n*, and pitman *p*, or their equivalents, substantially in the manner described, whereby the relative position of the cutters and fingers to each other is not materially varied when raised or lowered in respect to said main frame.

3. Limiting the distance which the inner end of the above-described cutting apparatus will vibrate from and toward the main frame, to which it is connected by the upright post Q, arm R, hinge-pins *a'* and *b'*, vertical slot *c*, and set-screw *d'*, or their equivalents, substantially as described.

4. So connecting said cutting apparatus to the main frame of the machine by the post Q, arm R, hinge-pins *a'* and *b'*, vertical slot *c'*, and set-screw *d'*, or their equivalents, that it can be retained at various heights above the ground, substantially as described.

JACOB SWARTZ.

Witnesses:
JAMES GUNNE,
ABRAM S. SWARTZ.